US005078945A

United States Patent [19]
Byron

[11] Patent Number: 5,078,945
[45] Date of Patent: Jan. 7, 1992

[54] COMBINED CANDLE HOLDER AND MOLD APPARATUS AND METHOD

[76] Inventor: David L. Byron, 247 Grand St., New York, N.Y. 10002

[21] Appl. No.: 680,169

[22] Filed: Apr. 3, 1991

[51] Int. Cl.⁵ .......... F23D 3/16; B29C 31/00

[52] U.S. Cl. .......... 264/278; 264/275; 264/37; 425/803; 431/292; 431/294

[58] Field of Search .......... 431/288, 289, 119, 292, 431/293, 294, 295; 425/803; 362/161, 181, 447; 264/37, 249, 275, 278, DIG. 69

[56] References Cited

U.S. PATENT DOCUMENTS

| | | | |
|---|---|---|---|
| 148,106 | 3/1884 | Bourland | 431/294 |
| 1,336,635 | 4/1920 | Knapp | 431/292 X |
| 1,842,904 | 1/1932 | Greenan | 431/294 |
| 2,122,451 | 7/1938 | Cassimatis | 425/803 |
| 2,681,555 | 6/1954 | Babbitt | 431/294 |
| 2,809,512 | 10/1957 | Hartnett | 431/294 |
| 3,724,982 | 4/1973 | Davis | 425/803 X |
| 3,726,632 | 4/1973 | Connolly | 431/294 X |

FOREIGN PATENT DOCUMENTS

| | | | |
|---|---|---|---|
| 628817 | 6/1963 | Belgium | 431/294 |
| 349521 | 6/1905 | France | 425/803 |
| 120299 | 11/1918 | United Kingdom | 431/297 |

*Primary Examiner*—Carl D. Price
*Attorney, Agent, or Firm*—Steinberg & Raskin

[57] ABSTRACT

Combined candle holder and mold apparatus includes a free-standing container having an open upper end and within which candle supporting structure is provided on which a burning candle is adapted to be supported so as to extend upwardly through and beyond the open container end. A wick has one of its ends connected to the candle supporting structure and its other end connected to a removable bottom closure member of the container so that the wick extends in the direction of the axis of the container through the substantial height thereof. In use, a burning candle is mounted on the supporting structure so that the apparatus functions as a candle holder. As the candle continues to burn the molten wax dripping therefrom falls into the container where it accumulates and solidifies around the wick so that the container thereby acts as a mold for the newly-forming candle. The newly formed candle is then removed from the container, such as through its bottom end which is normally closed by the removable bottom closure member.

11 Claims, 1 Drawing Sheet

FIG. 2
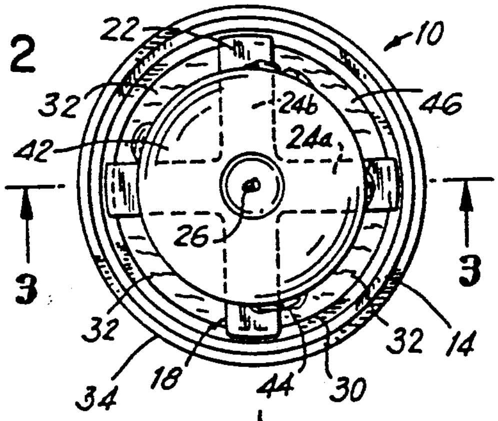
FIG. 1
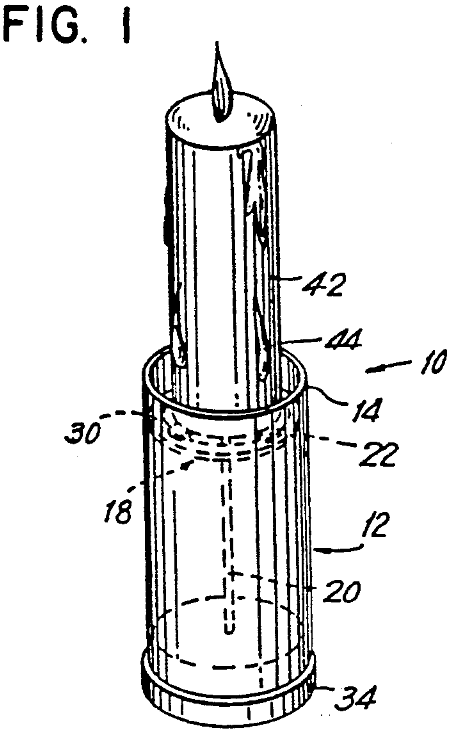
FIG. 3
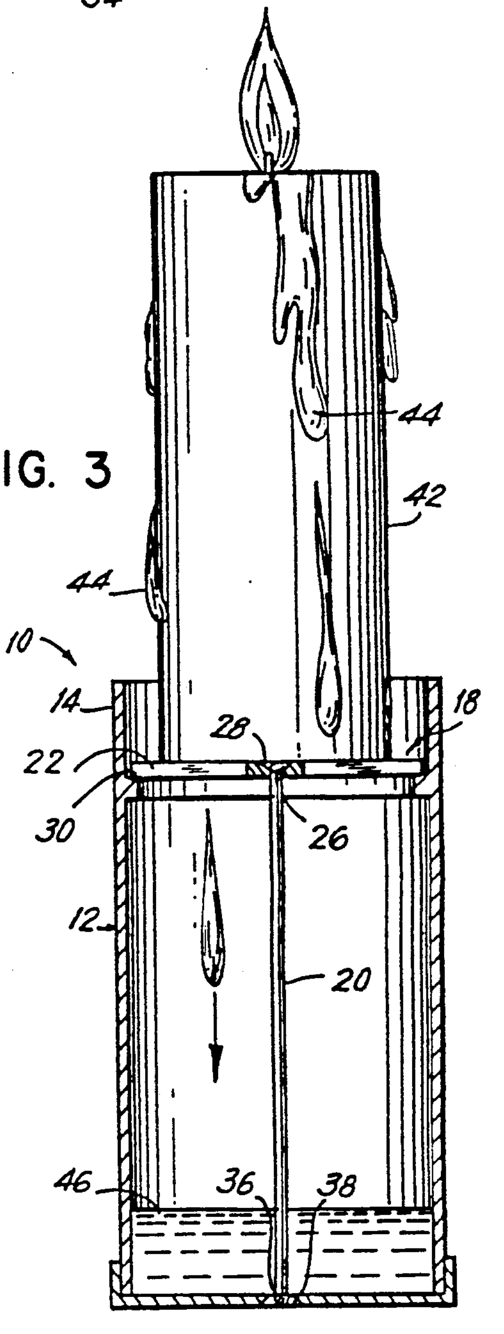
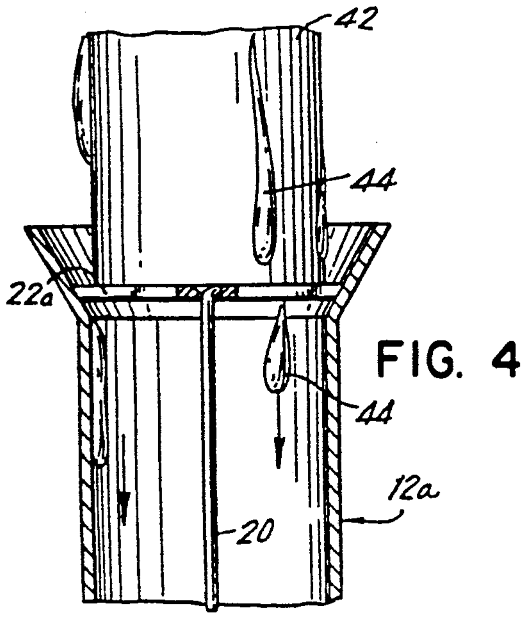
FIG. 4

COMBINED CANDLE HOLDER AND MOLD APPARATUS AND METHOD

BACKGROUND OF THE INVENTION

Conventional candles are generally constituted by bodies of wax (i.e., paraffin), tallow or like flammable substances in which a wick is embedded. In this connection, it will be understood that the term "wax" as used hereinbelow refers to any flammable substance conventionally used to constitute a candle body. When most candles are burned, the wax is gradually melted and drips in molten form, usually onto the candle holding device, where it solidifies in a shapeless mass. Thus, when a candle has been completely burned one is usually left with nothing of any practical value.

SUMMARY OF THE INVENTION

It is an object of the present invention to provide apparatus which will simultaneously function both as a holder for a burning candle as well as a mold for making a new candle from the molten wax which drips from the burning candle and a method for using the apparatus, thereby converting the candle burning process into an economical operation.

Briefly, in accordance with the present invention, this as well as other objects are attained by providing apparatus including a free-standing container having an open upper end within which candle supporting means are provided. A wick extends substantially axially through at least a portion of the container below the candle supporting means, the ends of the wick being connected to suitable means, such as the candle supporting means at it's upper end and a removable bottom closure member at it's lower end. In use, a burning candle is mounted on the supporting means to extend upwardly through and beyond the open upper end of the container so that the apparatus functions as a candle holder. As the candle continues to burn, the wax which drips therefrom falls past the candle supporting means into the container whereupon it accumulates and solidifies around the wick. In this manner the apparatus functions both as a candle holder and as a mold for a newly-forming candle whose body is formed from the same wax which previously constituted the burning candle. The newly-formed candle is then removed from the container, such as through it's bottom end by disconnecting the upper end of the wick and removing the bottom closure member on which the base of the newly-formed candle has been formed. The lower end of the wick is then disconnected and the closure member replaced to cover the container. Upon supplying a new wick the apparatus is then ready for reuse.

DESCRIPTION OF THE DRAWINGS

A more complete appreciation of the present invention and many of the attendant advantages thereof will be readily understood by reference to the following detailed description when considered in connection with the accompanying drawings in which:

FIG. 1 is a perspective view of one embodiment of the present invention illustrating its combined use as a candle holder and candle mold;

FIG. 2 is a top plan view of the apparatus illustrated in FIG. 1;

FIG. 3 is a section view taken along line 3—3 of FIG. 2; and

FIG. 4 is a fragmentary section view similar to FIG. 3 illustrating another embodiment of the present invention.

DESCRIPTION OF THE PREFERRED EMBODIMENTS

Referring now to the drawings wherein like reference characters designate identical or corresponding parts throughout the several views and more particularly to FIGS. 1-3, an embodiment of a combined candle holder and mold apparatus according to the present invention, generally designated 10, is illustrated and comprises a generally cylindrical free-standing container 12 having an open upper end 14 and a lower end which is normally closed by a removable bottom closure member 34, support means 18 for supporting a burning candle, and a wick 20 extending through container 12 in a substantially axial direction below the candle support means 18.

The container 12 is preferably formed of a pliable plastic material, such as polyethylene, and has a diameter at least slightly greater than the diameter of the candle to be held by the apparatus.

In the embodiment of FIGS. 1-3, the candle support means are constituted by a substantially X-shaped support member defined by a pair of integrally formed arms 24*a* and 24*b*, the upper surfaces thereof lying in a common plane. An opening 26 is formed through the support member 22 in the region of intersection of arms 24*a* and 24*b* and an enlarged countersunk recess 28 communicates with the upwardly facing planar surface of support member 22. An annular shoulder 30 extends inwardly from the side wall of container 12 and the support member 22 is sized such that it can be inserted into the container through it's open upper end 14 so that the end regions of arms 24*a* and 24*b* are supported on shoulder 30. In this manner, the support member 22 is situated within container 12 proximate to the open upper end of container 12. Moreover, it is noted that the construction of support member 22 defines relatively large spaces 32 between arms 24*a* and 24*b* so that the space above the support member 22 is relatively open to the space within container 12 situated below the support member 22.

The bottom end of the container 12 is normally closed by a removable closure member 34 also preferably formed of a pliable plastic material so as to positionable over the bottom container end and removably fixed thereto by a friction fit. A central opening 36 is formed through the closure member 34 and an enlarged counter-sunk recess 38 communicates with the downwardly facing surface of closure member 34.

A wick 20 is passed through the openings 26 and 36 of the support and closure members 22 and 34 and is appropriately knotted so that it extends in a substantially axial direction through the container 12 below the support member 22. Thus, the upper end of wick 20 is fixed to the support member 22 while it's lower end is fixed to the bottom closure member 34 and the wick is sized so that it is held in a relatively taut condition. Moreover, the knotted ends of wick 20 are received in the counter-sunk recesses 30 and 38 of support member 22 and closure member 34 so that these ends do no interfere with the planar configuration of the upwardly facing surface of support member 22 of the downwardly facing surface of closure member 34.

In use, a burning candle 42 is mounted on the support member 22. Thus, the candle is placed on the upwardly facing surface of the support member 22 in a stable manner due to the planar nature thereof. In this way, the apparatus functions as a candle holder. As the candle continues to burn, molten wax, designated 44 in the drawings, is formed and drips from the candle falling through the spaces 32 defined by support member 22 into the bottom region of container 12 where it solidifies around the wick 20. A partial solidified mass of wax constituting part of a newly-forming candle is designated 46. As the candle continues to burn the molten wax continues to fall into the container and solidify therein with the wick being embedded in the wax until a new candle is formed. The newly formed candle is removed from the container 12 by removing the bottom closure member 34 and sliding the newly formed candle from within the container. To facilitate removal of the candle, the inside of the container can be coated with a lubricant or releasing agent. Moreover, the container may be formed with a slight taper, the same becoming wider towards it bottom to further facilitate removal of the newly formed candle. The knotted ends of the wick are severed from the support and closure members 22 and 34. In this manner, the apparatus functions as a mold for newly-forming candles at the same time as it functions as a candle holder.

Referring to FIG. 4, another embodiment of apparatus according to the invention is illustrated which differs from the previously discussed embodiment in the manner in which the support member, designated 22*a*, is held in place within the container 12*a*. In this embodiment, the upper region of the side wall of container 12*a* is flared outwardly so that the inner surface thereof forms a support surface for the support member 22*a* with the outer ends of the arms forming the latter being bevelled to conform to the angle at which the side wall is flared. In other respects, the embodiment of FIG. 4 is essentially similar to that of FIGS. 1-3.

Obviously, numerous modification and variations of the present invention are possible in the light of the above teachings. For example, the support means may be constituted by other elements, such as a pair of crossing rods whose ends are fixed within holes or recesses formed in the side wall of the container and with the upper end of the wick being tied to the intersecting regions of the rods. The bottom end of the wick may be fixed to the bottom closure member in another manner than as shown. The container may have a configuration other than cylindrical. For example, the container can have a rectangular cross-section with a removable bottom. Moreover, it is not necessary to provide a container having a removable bottom closure member.

As an example, the container may be substantially spherical (having a flattened base surface) formed by a pair of hinged hemispheres. In this case, after the new candle is formed the hemispheres are pivoted about their hinged connection to open the container whereupon the newly formed candle is removed. In the case of a rectangular container, one of the sides thereof can be adapted to be removable, e.g., slideably connected to adjacent sides, to allow the newly formed candle to be removed from the container. Moreover, the container may be formed of translucent or opaque material. Accordingly, it is understood that within the scope of the claims appended hereto, the invention may be practiced otherwise than as specifically disclosed herein.

What is claimed is:

1. Combined candle holder and mold apparatus for supporting a burning candle and forming a new candle from the molten wax which drips from the burning candle, comprising:

a container having an open upper end and a bottom end;

means situated in said container for supporting a burning candle, said supporting means defining upper and lower spaces in the container above and below said supporting means, said candle supporting means providing passage means for intercommunicating said upper and lower spaces;

means for mounting a wick in said lower container space below said candle supporting means;

a wick adapted to be mounted in said lower container space by said mounting means below said candle supporting means; and means associated with said container for facilitating removing from said lower container space a new candle formed therein through the accumulation of molten wax dripping from the burning candle and its solidification around said wick;

whereby a burning candle can be supported on said candle supporting means such that as the candle continues to burn the molten wax dripping therefrom falls through the passage means defined by said candle supporting means into the lower space of the container below said candle supporting means where the wax accumulates and solidifies around said wick to form a new candle whereupon the new candle is removed from said container through said removal facilitating means.

2. The combination of claim 1 wherein said candle supporting means constitutes a support member having an upper surface on which a burning candle is supportable and a pair of opposed end regions, and further including means formed on said container for engaging said end regions of said support member to situate said support member in said container.

3. The combination of claim 2 wherein said engaging means constitute an inwardly extending shoulder formed on the inner surface of said container.

4. The combination of claim 2 wherein said engaging means constitutes an outwardly flared upper region of said container.

5. The combination of claim 2 wherein said support member is constituted by a substantially X-shaped member.

6. The combination of claim 2 wherein said new candle removal facilitating means comprises a removable bottom closure member removably situated on the bottom end of said container to close the same.

7. The combination of claim 6 wherein said wick mounting means are constituted by means for affixing one end of said wick to said candle support member and the other end of said wick to said removable bottom closure member.

8. The combination of claim 7 wherein an opening is formed in said candle support member to which said one end of said wick is knotted and an opening formed in said removable bottom closure member to which said other end of said wick is affixed.

9. A method for simultaneously holding a burning candle and forming a new candle, comprising the steps of:

supporting a burning candle in a container in which a wick is situated below the burning candle so that molten wax produced by the burning candle falls into a lower space defined within the container which is situated below the burning candle in which lower space the wick is situated;

accumulating the molten wax in the lower container space so that the wax solidifies around the wick to form a new candle; and removing the new candle from the container.

10. The method of claim 9 wherein the container has candle supporting means situated therein and has a removable bottom closure member and wherein the wick has a first end fixed to said candle supporting means and a second end fixed to said removable closure member, and wherein the steps of removing the new candle from within the container comprises removing the closure member and disconnecting the ends of the wick from the candle supporting means and bottom closure member.

11. The combination of claim 2 wherein said wick mounting means are constituted by means for affixing one end of said wick to said candle supporting means and the other end of said wick to said container or component associated therewith.

* * * * *